United States Patent

[11] 3,576,445

[72] Inventor Nissin Habib
Neptune, N.J.

[21] Appl. No. 717,658
[22] Filed Apr. 1, 1968
[45] Patented Apr. 27, 1971
[73] Assignee Bell Telephone Laboratories, Incorporated, Murray Hill, Berkeley Heights, N.J.

[54] TRANSISTOR LOGIC ARRANGEMENTS
4 Claims, 5 Drawing Figs.

[52] U.S. Cl. .......... 307/203, 307/214, 307/254, 307/215
[51] Int. Cl. .......... H03k 17/00
[50] Field of Search .......... 307/203, 214, 215; 330/24

[56] References Cited

UNITED STATES PATENTS

| | | | |
|---|---|---|---|
| 3,124,758 | 3/1964 | Bellamy et al. .......... | 330/24X |
| 3,271,590 | 9/1966 | Sturman .......... | 307/214 |
| 3,283,170 | 11/1966 | Buie .......... | 307/203X |
| 3,015,780 | 1/1962 | Schayes et al. .......... | 330/20 |

*Primary Examiner*—Donald D. Forrer
*Assistant Examiner*—B. P. Davis
*Attorneys*—R. J. Guenther and Kenneth B. Hamlin

ABSTRACT: A nonlinear network is combined with conventional transistor-transistor logic (TTL) circuits to provide an overall arrangement characterized by simplicity, low power dissipation, powerful logic capabilities, high-noise margins and the ability to charge capacitive loads in a high speed manner.

INVENTOR
N. HABIB
BY
Lucian C. Canepa
ATTORNEY

TRANSISTOR LOGIC ARRANGEMENTS

This invention relates to the selective translation of electrical signals and more particularly to improved logic arrangements.

BACKGROUND OF THE INVENTION

In recent years considerable effort has been directed at reducing the size and increasing the speed of digital information processing systems. In the course of this effort one of the logic technologies found to be particularly advantageous for implementing the basic building blocks of the systems is that known as transistor-transistor logic or TTL. Although TTL exhibits several meritorious characteristics it is known that it possesses at least two disadvantageous features. These are (1) the inability of a TTL circuit designed for low-power dissipation to drive capacitive loads in a high-speed manner, and (2) reduced noise margins whenever the driving transistor in a driven TTL circuit conducts a reverse emitter-to-collector leakage current.

SUMMARY OF THE INVENTION

An object of the present invention is to improve logic arrangements.

More specifically, an object of this invention is to increase the speed and improve the noise margins of logic arrangements while maintaining or even decreasing the power dissipation properties thereof.

Another object of the present invention is to provide logic arrangements characterized by reliability, simplicity and ease of fabrication.

These and other objects of the present invention are realized in a specific illustrative embodiment thereof that comprises an active network combined with a plurality of TTL circuits. Each TTL circuit of this embodiment comprises a multiple-emitter driving transistor and a grounded-emitter driven transistor. The network, which includes a biasing source, is connected between at least two such TTL circuits. More specifically, the network is connected between the collector electrode of the driven transistor in one TTL circuit (the driving circuit) and one of the emitter electrodes of the driving transistor in another TTL circuit (the driven circuit).

In accordance with the principles of the present invention the network includes a transistor switching configuration responsive to energization of the driven transistor in the driving TTL circuit for providing a relatively high impedance connection between the biasing source and the driven transistor in the driving circuit. At the same time the network responds to the energized condition of the specified transistor by providing a relatively low impedance load current path between the collector and emitter electrodes to which the network is connected. Furthermore, the configuration included in the network is responsive to deenergization of the driven transistor in the driving circuit for providing a relatively low impedance connection between the source and the emitter electrode of the driving transistor in the driven circuit.

Thus, during the time in which the driven transistor in the driving circuit is energized, the described network is effective to connect a high impedance source to the collector electrode of the driven transistor. As a result, very little current in addition to the load current flows through the driven transistor, whereby the power dissipated in this transistor is maintained at a near minimum value (determined by the load). On the other hand, when this driven transistor is deenergized, the network is effective to establish a low impedance connection between the biasing source contained therein and the emitter electrode of the driving transistor in the driven circuit. In this way any stray capacities or capacitive loads connected to the emitter are charged in a high speed manner via a low time constant path. Moreover, the noted low impedance renders the arrangement relatively insensitive to any reverse leakage currents that may flow between the source and the driven circuit.

It is a feature of the present invention that an active network including a source be combined with at least two transistors to switch the source between the transistors via respective high and low impedance paths in response to the energization and deenergization of one of the transistors.

It is another feature of this invention that the network provide a load current connection between the transistors during the time in which the source is connected to one of the transistors via the specified high impedance path.

DESCRIPTION OF THE DRAWING

A complete understanding of the present invention and of the above and other objects, features and advantages thereof may be gained from a consideration of the following detailed description of three specific illustrative embodiments thereof described hereinbelow in connection with the accompanying drawing, in which.

DETAILED DESCRIPTION

Figure 1:
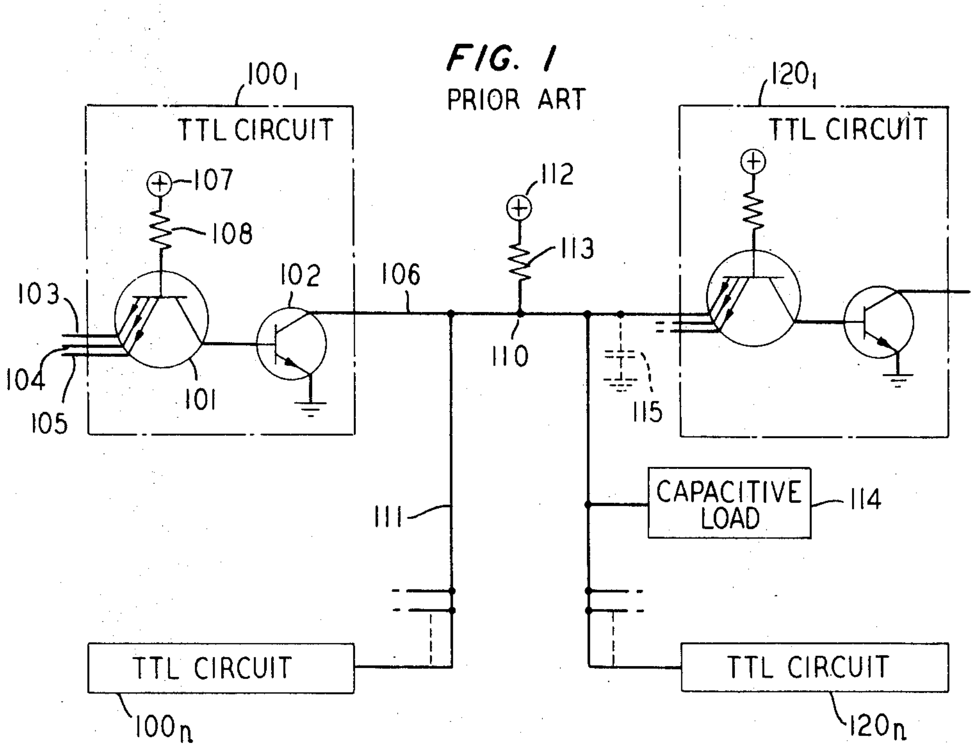
FIG. 1 PRIOR ART
FIG. 1 depicts a conventional prior art logic arrangement.

The conventional prior art arrangement shown in FIG. 1 includes a plurality of identical TTL circuits interconnected to form a logic array. The array comprises a plurality of driving TTL circuits $100_1 ... 100_n$ and a plurality of driven TTL circuits $120_1 ... 120_n$. In turn, each of the TTL circuits may be regarded as comprising intercoupled driving and driven transistors. Thus, for example, the circuit $100_1$ includes a multiple-emitter driving NPN transistor 101 and a grounded-emitter driven NPN transistor 102. Input signals are applied to the circuit $100_1$ via three leads 103, 104 and 105. An output signal that is a logical function of the inputs applied to the circuit $100_1$ appears on lead 106 which is connected to the collector electrode of the transistor 102. The base electrode of the transistor 101 is connected to a positive bias source 107 via a resistor 108, and the collector electrode of the transistor 101 is directly connected to the base electrode of the transistor 102.

A ground or near-ground signal applied to any one of the input leads 103 through 105 of the circuit $100_1$ causes conduction across the corresponding base-to-emitter junction of the driving transistor 101. This establishes the base electrode of the transistor 101 at a potential that is not sufficiently positive with respect to ground to energize the driven transistor 102. Hence under such conditions the transistor 102 does not conduct and the output lead 106 is maintained above ground. On the other hand, if all the input leads 103 through 105 are maintained sufficiently positive to block conduction through the base-to-emitter junctions of the transistor 101, the source 107 is effective to cause current flow through the base-to-collector junction of the transistor 101 and the base-to-emitter junction of the transistor 102. As a result of such input conditions, the unit 102 is driven into conduction and the output lead 106 is established at a potential that is only slightly positive with respect to ground (by the amount of the collector-to-emitter drop of the unit 102).

Thus, node point 110 shown in FIG. 1 is maintained near-ground if the transistor 102, or any one of the other driven transistors in the TTL circuits represented as being connected to lead 111, is in its conducting state. Conversely, the point 110 is maintained above ground if none of the TTL circuits coupled thereto has its driven transistor energized. In this latter case the node point 110 is established at a positive potential by a source 112 which is connected to the point 110 by a resistor 113. (Although the depicted arrangement can perform logic without the resistor 113, the inclusion of that element is advantageous in that it significantly improves the speed and noise margin characteristics of the arrangement.) In turn, the potential appearing at the point 110 constitutes the input signal applied to the driven circuits $120_1 \ldots 120_n$. These driven circuits respond to near-ground and positive signals applied thereto in exactly the same manner described above in connection with the operation of the driving circuit $100_1$.

In addition to having the signals appearing at the node point 110 of FIG. 1 control the states of the driven circuits $120_1 \ldots 120_n$, it may be necessary to apply those signals to a capacitive load 114. Even if a lumped capacitive load is not actually connected to the point 110, as specifically indicated in FIG. 1, there will inevitably be stray capacities associated with the depicted arrangement. (Such stray capacities are represented in FIG. 1 by a dashed element 115.) Hence, the illustrated logic arrangement is required as a practical matter to charge and discharge capacitors in the course of its normal operation.

Selection of the value of the resistor 113 involves a compromise. On the one hand this resistor should be chosen to be sufficiently large to limit the current flow through the transistor 102 to maintain the power dissipated therein within prescribed limits. Thus, for example, to allow a high packing density of components in a microminiature implementation of the depicted logic arrangement, it is advantageous that the resistor 113 be sufficiently large so that very little current other than load current flows through the transistor 102 when it is switched to its energized state. However, a relatively large value for the resistor 113 increases the time constant for charging capacitive elements (connected to the node point 110) when the driven transistor 102 is deenergized. Moreover, a large value for the resistor 113 makes the illustrated arrangement relatively noise sensitive whenever reverse leakage currents flow through the resistor 113 and into the emitters of transistors driven from the node point 110. Ideally, the value of the resistor 113 should be large when the transistor 102 conducts and small when the transistor 102 is switched to its nonconducting state.

In accordance with the principles of the present invention the resistor 113 shown in FIG. 1 is replaced by an active network 200 (FIG. 2) interposed between a plurality of driving and driven circuits configured, for example, to form a TTL arrangement of the same overall type shown in FIG. 1. Various implementations for the network 200 are possible. Three specific illustrative configurations therefor are respectively shown in FIGS. 3 through 5. As will be evident from the description hereinbelow, the network 200 cooperates in a meritorious way with the depicted TTL circuits to overcome the above-specified disadvantages of the prior art arrangement shown in FIG. 1.

Figure 2:
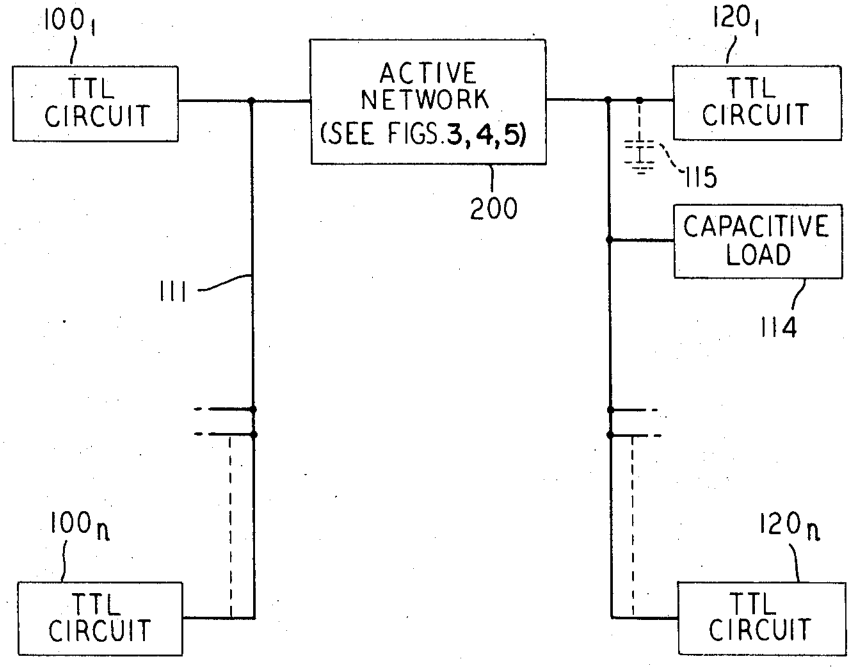
FIG. 2 is a block diagram representation of a logic arrangement including an active network made in accordance with the principles of the present invention.
Figure 3:
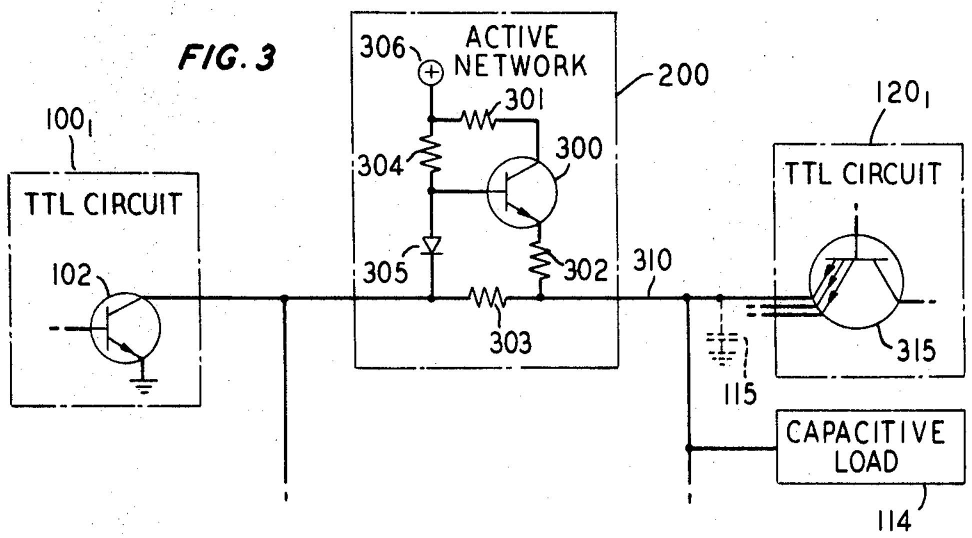
FIGS. 3 through 5 respectively show the circuit details of portions of three logic arrangements including specific active networks that embody the principles of this invention.

FIG. 3 depicts the configuration of a specific illustrative active network 200 and in addition indicates the manner in which the network is interconnected with the other components shown in FIG. 2. The network includes an NPN transistor 300, resistors 301 through 304, a diode 305 and a bias source 306, all interconnected as shown in FIG. 3. It is noted that the resistor 301 is included for short circuit protection only and may if desired be omitted altogether.

The operation of the FIG. 3 arrangement is as follows: Initially, assume that the transistor 102 in the driving TTL circuit $100_1$ is in its conducting state. As a result, current flows from the source 306 through the resistor 304 and the diode 305 into the collector electrode of the energized transistor 102. Load current also flows into the collector electrode of the transistor 102. This latter current flows in the lead marked 310 from right to left through the resistor 303. The voltage developed across the resistor 303 subtracts from the tendency of the forward drop across the diode 305 to forward bias the base-to-emitter junction of the transistor 300. In practice, the resultant of the voltages appearing across the diode 305 and the resistor 303 is insufficient to break down the base-to-emitter junction of the transistor 300, whereby the unit 300 is maintained in a deenergized or high-impedance condition. Moreover, the small amount of leakage current that may flow through the emitter resistor 302 causes a voltage drop thereacross that further reduces the tendency to forward bias the base-to-emitter junction of the transistor 300. (The value of the resistor 302 may be reduced to zero at the expense of increased emitter current in the unit 300. However, with a suitable choice of parameters, this increase can be kept acceptably small.) It is significant to note that the value of the resistor 304 included in FIG. 3 can be made relatively large (having only to supply the base current required by the transistor 300 when it is energized). Hence, the amount of current emanating from the source 306 that flows through the energized transistor 102 can be kept very small, thereby to keep the total current flow from collector to emitter of the transistor 102 at a level substantially equal to the load current value alone. In this way the power dissipated in the transistor 102 is maintained at a near-minimum value.

During the operating conditions assumed above for the FIG. 3 arrangement, the voltage with respect to ground of the output lead 310 is established at a relatively low positive voltage which is equal to the drop across the resistor 303 plus the collector-to-emitter potential of the transistor 102. As a consequence, the capacitive load 114 and the stray capacities 115 are charged to this relatively low output value.

Assume now that the transistor 102 of FIG. 3 is deenergized. As a result, the voltage at its collector electrode rises and current starts flowing into the aforementioned capacitive elements connected to the output lead 310. This charging current comprises the current that flows through the diode 305 plus the emitter current of the transistor 300. The relationship between these two current components is determined by the relationship between the values of the resistors 302 and 303. In practice it is desired to make the value of the resistor 302 as small as possible, thereby to minimize the time constant and hence maximize the speed at which the capacitive elements connected to the output lead 310 are charged to their relatively high positive values indicative of the transistor 102 being deenergized. If the value of the resistor 302 is much smaller than that of the resistor 303, the specified charging current is primarily supplied by the noted emitter current which is $\beta+1$ times the base current supplied to the transistor 300. This charging current can be made as large as needed, being constrained only by the above-specified relationships and the amount of limiting resistance (the unit 301) provided for the purpose of circuit protection. Even if the resistor 302 cannot be made very small, there is still a speed improvement in the operation of the depicted arrangement. Specifically, there is still an improvement in the time required to drive the potential of the output lead 310 to the higher positive level necessitated by the deenergization of the transistor 102. This improvement stems from a reduction in the charging time constant by a factor of approximately $$\frac{R_{302}}{R_{302}+R_{303}}$$

below a conventional TTL arrangement (FIG. 1) characterized by the same power dissipation properties. ($R_{302}$ and $R_{303}$ respectively designate the ohmic values of the resistors 302 and 303.)

With the output lead 310 shown in FIG. 3 established at a relatively high positive potential, and assuming that the other emitter electrodes of the transistor 315 in the driven TTL circuit $120_1$ are also maintained at relatively high potentials, the base-to-emitter junctions of the transistor 315 will be maintained nonconductive. Under these circumstances, however, reverse (from left to right) emitter-to-collector current may flow through the transistor 315. But even if such reverse current does flow, the relatively high positive potential of the output lead 310 will not be reduced to any substantial extent. This is so because of the relatively low impedance path provided by the network 200 between the lead 310 and the source 306. In fact, if the values of the resistors 301 and 302 are reduced to zero (and neglecting the relatively low collector-to-emitter impedance of the energized transistor 300) the source 306 will appear (looking to the left from the lead 310) to be a substantially invariant voltage source. In other words, the output voltage level of the lead 310 will be maintained at about its prescribed relatively high positive value despite the noted reverse current flow through the transistor 315. Hence, the degradation in this voltage value that usually occurs with the flow of reverse current (in a conventional TTL arrangement) is not evident to any significant extent in the FIG. 3 embodiment. Accordingly, the noise margins of the depicted arrangement are maintained at or near their prescribed values, whereby the susceptibility of the arrangement to spurious noise signals is not significantly increased in the presence of reverse current flow.

Figure 4:
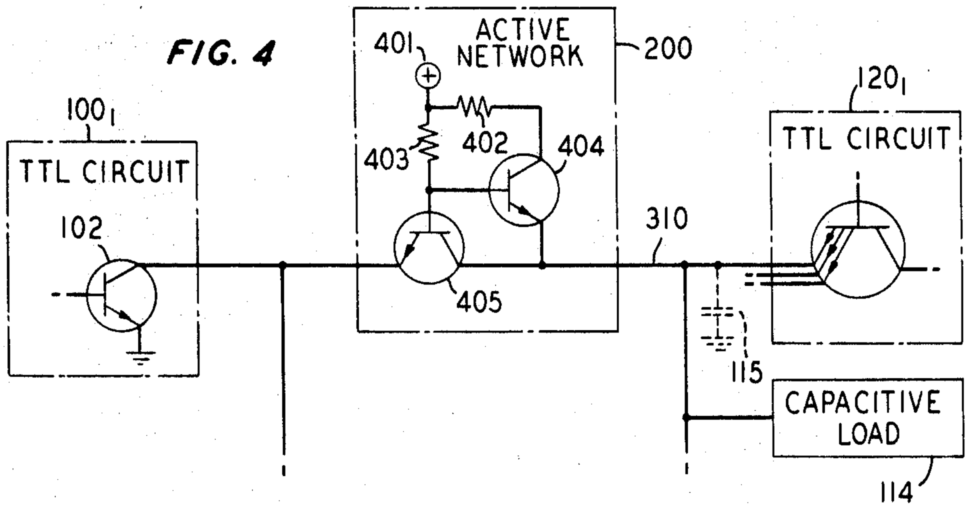

A second specific illustrative network made in accordance with the principles of the present invention is shown in FIG. 4. The depicted network comprises a bias source 401, two resistors 402 and 403 and two NPN transistors 404 and 405.

The operation of the FIG. 4 arrangement is as follows: When the transistor 102 in the driving TTL circuit 100, is energized, current flows from the source 401 through the resistor 403 and the base-to-emitter junction of the transistor 405 into the collector electrode of the transistor 102, whereby the transistor 405 is energized. Since the collector-to-base voltage of the energized transistor 405 is designed to be less than the base-to-emitter forward breakdown voltage of the transistor 404, emitter current flow in the transistor 404 will be negligible or at least much smaller than the base current of the transistor 405. Therefore, with a relatively large value for the resistor 403, very little current in excess of the load current will flow into the collector electrode of the transistor 102. (The load current flows from collector to emitter of the energized transistor 405.) In this way the power dissipated in the transistor 102 is maintained at a near-minimum value during the time in which load current is controlled to flow therethrough.

When the transistor 102 shown in FIG. 4 is deenergized, current flow across the base-to-emitter junction of the transistor 405 is terminated (since no current can then flow into the collector electrode of the transistor 102). Under these circumstances, current flows through the base-to-emitter junction of the transistor 404, whereby the unit 404 is energized and a low impedance path is provided between the source 401 and the output lead 310. (The inclusion in the network of the short circuit protection resistor 402 is optional; if desired, its value may be reduced to zero.) The availability of this low impedance path makes it possible for the source 401 to charge the capacitive load 114 and the stray capacities 115 in a high speed manner. In addition, as noted above in connection with the description of FIG. 3, this low impedance characteristic is effective to preserve the noise margins of the FIG. 4 arrangement even if reverse currents should flow through the emitter-to-collector paths of the multiple-emitter transistors connected to the output lead 310.

When the transistor 102 shown in FIG. 4 is deenergized, proper operation of the depicted arrangement depends on the forward voltage drop appearing across the base-to-emitter junction of the energized transistor 404 being less than the forward breakdown voltage of the base-to-collector junction of the transistor 405. This condition, which is readily attained by proper selection of the units 404 and 405, ensures that the major portion of the current supplied from the source 401 to the output lead 310 will flow in the emitter path of the transistor 404 and that very little, if any, of this current will flow across the base-to-collector junction of the unit 405.

Figure 5:
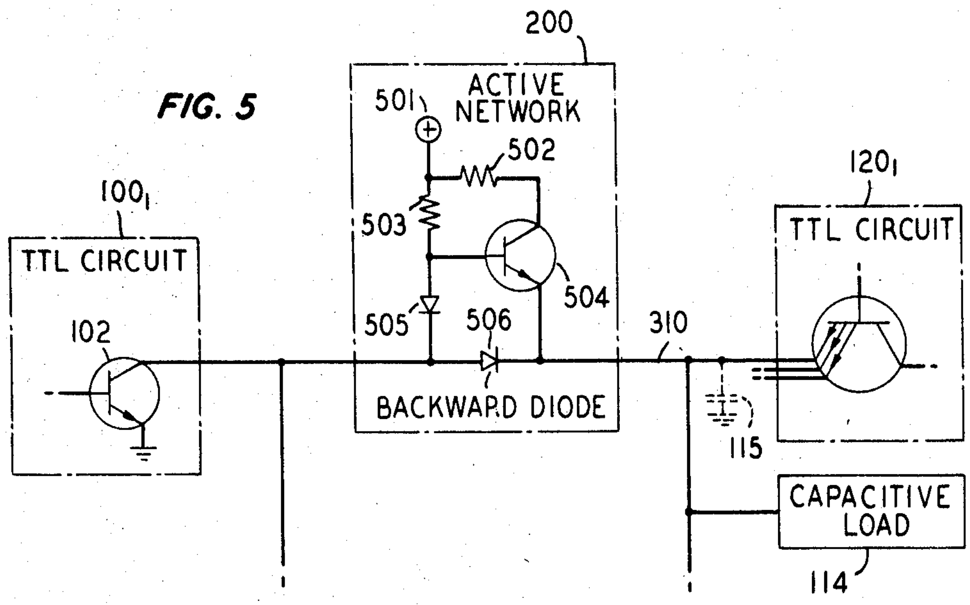

FIG. 5 shows the configuration of a third specific illustrative network made in accordance with the principles of the present invention. This network includes a bias source 501, resistors 502 and 503, an NPN transistor 504, a conventional asymmetrically conducting diode 505 and a so-called backward diode 506. (Backward diodes are well known in the art, being described, for example, in G. L. Pearson, U.S. Pat. No. 2,952,824, issued Sept. 13, 1960.)

The operation of the FIG. 5 arrangement is as follows: When the transistor 102 is energized, load current flows in the output lead 310 from right to left through the backward diode 506 and into the collector electrode of the transistor 102. Illustratively, the diode 506 is selected to have a characteristic such that the flow of this load current through the diode in the reverse direction causes a voltage drop thereacross of about 50 millivolts. Current also flows into the collector electrode of the energized transistor 102 from the source 501. This latter current flows through the resistor 503 and the conventional diode element 505. The forward voltage drop across the diode 505 minus the level shift of about 50 millivolts appearing across the diode 506 is designed to be less than the forward breakdown voltage of the base-to-emitter junction of the transistor 504. Hence, when the transistor 102 is energized, the unit 504 remains deenergized and the only current components that flow in the collector-to-emitter path of the transistor 102 are the load current and the current that flows through the resistor 503 and the diode 505. By appropriate selection of the value of the resistor 503, this second-mentioned current component is established to be substantially less than the load current. Accordingly, the power dissipated in the unit 102 can be thereby maintained at a near-minimum value.

The relative small voltage drop appearing across the backward diode 506 when the transistor 102 is energized establishes the voltage of the output lead 310 at a value that is only slightly more positive than the characteristic collector-to-emitter voltage of the energized transistor 102. Therefore, for the above-described condition, the FIG. 5 arrangement exhibits inherently high immunity to noise.

When the transistor 102 of FIG. 5 is deenergized, the transistor 504 is energized by current flow from the source 501. The resultant base-to-emitter voltage of the unit 504 is chosen to be less than the series-aiding forward breakdown voltages of the diodes 505 and 506, whereby the units 505 and 506 remain nonconductive while the transistor 504 is energized. Accordingly, the charging current that flows in the output lead 310 is mainly determined by the emitter current of the unit 504. (Again the value of the short circuit protection resistor 502 may, if desired, be reduced to zero.) Because of the low impedance characteristic of the path that extends from the source 501 to the lead 310, any capacitive elements connected to the lead 310 are charged in a high speed manner. Moreover, for the same reasons described above in connection with the description of FIGS. 3 and 4, the FIG. 5 arrangement exhibits advantageous noise margins even if reverse currents should flow into the emitter electrodes of driven transistors connected to the lead 310.

Thus, there have been described in detail herein three specific illustrative networks adapted to be interconnected with TTL circuits to form overall logic arrangements exhibiting improved characteristics.

It is to be understood that the above-described arrangements are only illustrative of the application of the principles of the present invention. In accordance with these principles numerous other arrangements may be devised by those skilled in the art without departing from the spirit and scope of the invention. For example, although emphasis herein has been directed to combinations that include the herein-considered networks combined with TTL circuits, the networks are well suited to be associated with other types of circuits to form overall arrangements that embody the advantageous selective control functions described above.

I claim:

1. A network comprising:
input and output terminals,
a bias source,
first and second control transistors each including base, emitter and collector electrodes,
a relatively low impedance electrical connection extending between said source and the collector electrode of said first control transistor, a first direct electrical connection extending between the base electrodes of said first and second control transistors, a relatively high impedance electrical connection extending between said source and said first connection, a second direct electrical connection extending between the emitter electrode of said second control transistor and said input terminal, a third direct electrical connection extending between the emitter electrode of said first control transistor and the collector electrode of said second control transistor, and a fourth direct electrical connection extending between said third connection and said output terminal, whereby a relatively high impedance path is established between said source and said input terminal and a relatively low impedance path is established between said input and output terminals in response to the application to said input terminal of a first one of two specified information-indicating potentials and a relatively low impedance path is established between said source and said output terminal in response to the other of said information-indicating potentials.

2. A network comprising:

input and output terminals, a bias source, a control transistor having base, emitter and collector electrodes, a relatively low impedance electrical connection extending between said source and the collector electrode of said control transistor, a relatively high impedance electrical connection extending between said source and the base electrode of said control transistor, an asymmetrically conducting diode element connected between the base electrode of said control transistor and said input terminal, a backward diode element connected between said input and output terminals, said backward diode element being poled in a series-aiding relationship with said first-mentioned diode element with respect to current flow between said source and said output terminal, and a direct electrical connection extending between the emitter electrode of said control transistor and said output terminal, whereby a relatively high impedance path is established between said source and said input terminal and a relatively low impedance path is established between said input and output terminals in response to the application to said input terminal of a first one of two specified information-indicating potentials and a relatively low impedance is established between said source and said output terminal in response to the other of said information-indicating potentials.

3. In combination in a logic arrangement:

a driving transistor comprising an input base electrode, an output collector electrode and an emitter electrode, a driven transistor comprising an input emitter electrode, an output collector electrode and a base electrode, a bias source, first and second control transistors each including base, emitter and collector electrodes, a relatively low impedance electrical connection extending between said source and the collector electrode of said first control transistor, a first direct electrical connection extending between the base electrodes of said first and second control transistors, a relatively high impedance electrical connection extending between said source and said first connection, a second direct electrical connection extending between the emitter electrode of said second control transistor and the collector electrode of said driving transistor, a third direct electrical connection extending between the emitter electrode of said first control transistor and the collector electrode of said second control transistor, and a fourth direct electrical connection extending between said third connection and the emitter electrode of said driven transistor, whereby a relatively low impedance path is completed between the collector electrode of said driving transistor and the emitter electrode of said driven transistor and a relatively high impedance path is provided between said bias source and the collector electrode of said driving transistor in response to the energization of said driving transistor and a relatively low impedance path is provided between said source and the emitter electrode of said driven transistor in response to the deenergization of said driving transistor.

4. In combination in a logic arrangement:

a driving transistor comprising an input base electrode, an output collector electrode and an emitter electrode, a driven transistor comprising an input emitter electrode, an output collector electrode and a base electrode, a bias source, a control transistor having base, emitter and collector electrodes, a relatively low impedance electrical connection extending between said source and the collector electrode of said control transistor, a relatively high impedance electrical connection extending between said source and the base electrode of said control transistor, an asymmetrically conducting diode element connected between the base electrode of said control transistor and the collector electrode of said driving transistor, said diode element being poled to conduct forward current in the direction of forward current flow from collector to emitter of said driving transistor, a backward diode element connected between the collector electrode of said driving transistor and the emitter electrode of said driven transistor, said backward diode element being poled in a series-aiding relationship with said first-mentioned diode element with respect to current flow between said source and the emitter electrode of said driven transistor, and a direct electrical connection extending between the emitter electrode of said control transistor and the emitter electrode of said driven transistor, whereby a relatively low impedance path is completed between the collector electrode of said driving transistor and the emitter electrode of said driven transistor and a relatively high impedance path is provided between said bias source and the collector electrode of said driving transistor in response to the energization of said driving transistor and a relatively low impedance path is provided between said source and the emitter electrode of said driven transistor in response to the deenergization of said driving transistor.